Jan. 1, 1963  E. J. SCHIMKE  3,071,246
COMBINE ATTACHMENT
Filed Dec. 22, 1960
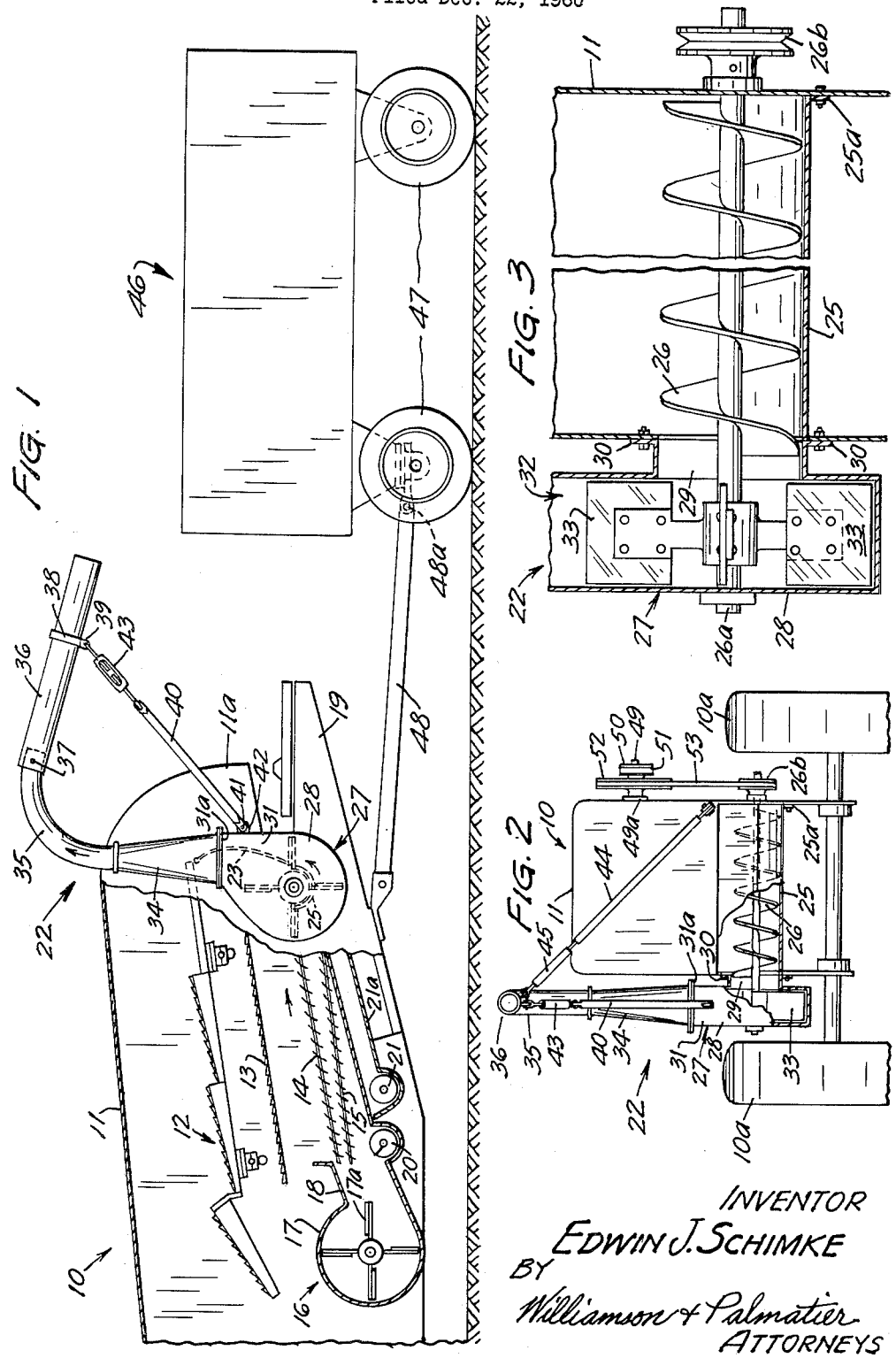
INVENTOR
Edwin J. Schimke
BY
Williamson + Palmatier
ATTORNEYS United States Patent Office 3,071,246
Patented Jan. 1, 1963

3,071,246
COMBINE ATTACHMENT
Edwin J. Schimke, Stanton, N. Dak.
Filed Dec. 22, 1960, Ser. No. 77,618
7 Claims. (Cl. 209—27)

This invention relates to harvesting combines and more particularly to apparatus for use with harvesting combines which is especially adaptable for collecting and conveying a chaff material when the latter is separated from the granular crop during the harvesting operation.

In most conventional harvesting combines, the chaff material is separated from the granular crops by an aspiration process and this chaff material is entrained in a stream of air and discharged through the rear of the combine and is thereafter deposited upon the surface of the ground. The chaff material ordinarily contains substances which are not desirable for human consumption but it has been found that this chaff material actually constitutes a valuable food for farm animals when mixed with hay and silage.

It is also well known in the art that the chaff material also contains undesirable granular materials such as wild oats, barley beards and the like which are normally of substantially lighter weight than the granular crop being harvested and the seeds from these undomesticated plants when discharged upon the ground quite often germinate and grow the following season. As it is well known in the art, heavy growth of the undomesticated plants such as wild oats, barley beards and the like very noticeably affects the crop yield and the various methods of controlling these wild plants are not always efficient to prevent their growth. My invention is directed towards overcoming these problems.

It is, therefore, a general object of my invention to provide an apparatus of simple and inexpensive construction and operation, for use with combines and which is especially adaptable for collecting and conveying the chaff material normally discharged upon the surface of the ground during the harvesting operation.

Another object of my invention is to provide a novel and improved chaff collecting and conveying attachment which may be readily mounted upon any conventional harvesting combine structure without any basic alteration of the conventional combine structure and which serves to collect the chaff material comprised of weeds, seeds, wild oats, barley beards and the like, the attachment including conveyor mechanism for quickly and efficiently conveying the chaff material into a receptacle.

Another object of my invention is the provision in conventional harvesting combine of a novel and improved chaff-collecting and conveying apparatus which is arranged and constructed to obviate the necessity of bailing the straw discharged upon the surface of the ground after the harvesting operation, to thereby effect a great saving of time and labor during the harvesting season.

A more specific object of my invention is the provision in a conventional harvesting combine of a novel chaff-collecting and conveying device which includes a deflector member readily attachable to the harvesting combine and which serves to deflect the air-entrained chaff material into a conveying mechanism so that said chaff material is readily and efficiently conveyed rearwardly of the harvesting combine to a trailing chaff-receiving receptacle connected in articulated towed relation with the combine.

These and other objects and advantages of my invention will more fully appear from the following description, made in connection with the accompanying drawings, wherein like reference characters refer to the same or similar parts throughout the several views, and in which:

FIG. 1 is a side view of a conventional harvesting combine incorporating my section and illustrated partly in elevation and partly in sections;

FIG. 2 is a rear elevational view of the combine incorporating my invention with parts thereof broken away for clarity, and FIG. 3 is a fragmentary detailed longitudinal sectional view on an enlarged scale of the invention.

Referring now to the drawings, it will be seen that a threshing machine such as a conventional harvesting combine, designated by the reference numeral 10 is partially illustrated in FIG. 1. Although the drawing does not illustrate the completed construction of the harvesting combine 10, it is pointed out that the embodiment illustrated in FIG. 1 is of the self-propelled type although my invention may be used equally with tow-type combines. The combine 10 is provided with driven ground engaging wheels 10a and although not shown will also be provided with means for conveying the cut grain to the threshing cylinder. In the event the harvesting operation involves cutting of standing crops, a swather in the form of a power driven reel and a cutter bar will be provided for cutting and urging the crops rearwardly into the conveyor mechanism. In the event the grain is picked up from previously cut windrows, such a swather attachment will not be necessary.

Although the particular construction of the combine constitutes no part of the present invention, it is pointed out that the cut grain will be conveyed positively to a threshing cylinder and grate mechanism, the operation of which causes the initial separation of the grain. Most of the separation of the grain from the straw and chaff will take place at the threshing cylinder and the separated straw will be conveyed rearwardly into and through a separator shoe or housing 11 by means of reciprocating straw walkers 12. As pointed out above, most of the separation takes place at the threshing cylinder but any grain that has not become separated from the straw will be caused to be separated therefrom because of the agitation or reciprocation from the straw walkers. This grain will fall from the straw walkers into a suitable grain return pan 13 and this grain will be caused to thereafter fall upon a conveyor to be fed to the chaffer sieve 14. The grain separated at the threshing cylinder will also be conveyed to the chaffer sieve 14 and this sieve along with the grain sieve 15 are mounted for reciprocating movement and within the separator shoe housing 11.

A fan mechanism 16 is positioned forwardly of and below the sieve mechanism which includes chaffer sieve 14 and grain sieve 15 and this fan mechanism includes a housing 17 having a rearwardly and upwardly extending tangential discharge 18. A bladed fan 17a is positioned within the housing 17 for producing an upwardly and rearwardly moving stream of air which passes through the grain sieve 15 and chaffer sieve 14. The combined agitation of the sieves and upwardly moving stream of air aspirates the chaff which includes weeds, seeds, stems and undesirable grain material such as wild oats and the like and this chaff material will be entrained within the stream and discharged rearwardly through the separator housing 11. The straw which is moved rearwardly by the reciprocating movement of the straw walkers 12 will be discharged downwardly and rearwardly through a rear straw discharge 11a at the rear of the separator shoe housing 11 and the straw along with the chaff will fall upon a straw spreading mechanism 19 which causes the straw to be widely dispersed to the rear of the combine.

Most of the chaff is separated from the grain when the grain passes through the chaffer sieve and falls upon the grain sieve 15 and then into a clean grain auger 20 which will convey the grain into the grain tank or bin for storage purposes. In the event that some of the grain passes rearwardly over the chaffer sieve 14 and grain sieve 15, this grain will fall upon a tailings grain pan 21a and will be thereafter caused to slide downwardly into a tailings auger 21 which will convey the grain up to the threshing cylinder for passage therethrough. The foregoing structure which permits separation of the grain from the straw is old and does not constitute, per se, part of the invention.

As pointed out above, it has been found out that the chaff material which contains grain such as wild oats and the like, also contains good wheat kernels as well as seeds and stems and the like, has a relatively high food value when mixed with hay or silage and does improve the quality of the feed. It is, therefore, desirable to save this chaff so that it may be used for feed purposes. It is also desirable to keep the weeds, wild oats, barley beards, sow thistles and the like from being dispersed again into the field since dispersal of these seeds would result in germination of the seed and growth of this type of plant would noticeably interfere with the crop yield. I have therefore provided a chaff collecting and conveying attachment which may be readily attached to any conventional harvesting combine to permit ready and efficient collecting and conveying of the chaff material separated during the harvesting of any granular type crops, the chaff material being conveyed to a suitable receptacle.

My novel chaff collecting and conveying attachment designated in its entirety by the reference numeral 22 includes a deflector member 23 which in the embodiment shown is formed of a substantially rigid metallic material and which is positioned transversely of the separator shoe housing 11 adjacent the rear thereof. This deflector member which is of arcuate configuration is hingedly connected to the separator shoe housing such that it is positioned within the path of the air entrained stream of chaff material. The chaff material which is moving rapidly towards the rear of the separator shoe housing will impinge against the deflector member 23 and will be deflected downwardly therefrom.

An elongate substantially U-shaped channel structure 25 is detachably mounted on the separator shoe housing 11 below said deflector member for receiving the deflected chaff material therein. An auger or screw-type conveyer 26 is positioned within the channel structure 25 and cooperates therewith for conveying the material within the channel structure to one end thereof. A pneumatic conveying means 27 is mounted at the discharge end of the channel structure 25 and this pneumatic conveying means includes a substantially closed fan housing 28 having an inlet 29 which is arranged in communicating relation with the channel structure. Actually, the fan housing is integrally formed with the channel structure 25 and it will be noted that the inlet 29 may be provided with an annular flange 30 to permit the chaff collecting and conveying attachment to be mounted on the sides of the shoe housing by conventional securing means such as bolts or the like. It will also be noted that the opposite end of the channel structure 25 is provided with an out-turned flange 25a for attachment and support of the opposite end of the channel structure to its associated shoe housing wall.

The fan housing 28 is provided with an upwardly extending tangential discharge 31 and it will also be noted that the auger conveyer 26 has a shaft extension 26a which projects axially into the fan housing 28. A fan mechanism 32 is affixed to the shaft extension 26a of the auger conveyer 26 and this fan mechanism is a conventional paddle type fan having a plurality of paddles or blades 33 as best seen in FIG. 1. The tangential discharge 31 is provided with an annular out-turned flange 31a to facilitate attachment of the discharge outlet to a frusto conically shaped conduit 34 by conventional attachment means such as bolts and the like. The upper end of the conduit 34 telescopically receives the lowermost portion of an elbow conduit section 35 therein while the opposite end of the elbow conduit is telescopically received within an elongate substantially straight discharge conduit spout 36. The elbow conduit and discharge spout section 36 are pivotally connected together by means of pivot 37 to permit vertical adjustment of the discharge spout 36 about a substantially horizontal transverse axis.

In order to effect the adjustment of the elongate discharge spout 36, this section is provided with an annular collar 38 having a pair of tabs 39 depending therefrom. An elongate rod 40 has one end thereof pivotally connected as at 41 to a tab 42 affixed to the fan housing 28. The other end of rod 40 is pivotally connected to a turnbuckle structure 43, the latter being pivotally connected to one of the tabs 39. Another elongate rod 44 is provided with a turnbuckle 45 at one end thereof and this rod is also connected at its other end to the shoe housing 11. Thus, it will be seen that because of the inherent extensible and retractable adjustment of the turnbuckle structures 43 and 45 the spout 36 may be adjusted vertically about its axis of pivot 37.

I have also provided a receptacle for receiving the conveyed chaff material and this receptacle 46 is provided with ground engaging wheels 47 for traversing movement over the ground. The receptacle 46 is towed by the combine 10 and is connected thereto by a hitch 48 having an articulate connection 49 between the hitch 48 and the wheeled receptacle 46.

In use, my novel chaff collecting and receiving attachment may be quickly mounted on any conventional combine structure without basically altering the construction of the combine. When the attachment is mounted on a combine, the chaff material, as pointed out above, will be conveyed rearwardly and will impinge against the deflector member 23 and be deflected downwardly to the channel structure 25. The auger conveyer 26 will convey the material quickly to one end of the channel structure, through the inlet 25 and into the fan housing 28. Since the bladed fan structure is formed on the end of the auger shaft extension 26a, then the fan will be operating simultaneously with the auger. Rotation of the bladed fan mechanism 32 will result in the production of a rapidly moving stream of air and this air will cause the chaff material within the housing to be entrained therein and the chaff material will thereafter be discharged through the tangential discharge outlet 31. The air-entrained chaff material will be conveyed rearwardly through the discharge spout 36 and be discharged into the wheeled receptacle 46, the latter being towed by the combine. It is pointed out that in the embodiments shown the stream of air has sufficient velocity and pressure so that the material will be conveyed to the rear of the wheeled receptacle for loading thereat. With this arrangement, the receptacle may be evenly loaded by adjusting the position of the spout 36 during the loading operation.

The drive means for the auger 26 comprises a conventional endless V-belt drivingly connected to the power take off of the combine. It will be noted that the one end of the auger conveyer 26 is provided with a pulley 26b rigidly mounted thereon. A small driven shaft 49 is rotatably journalled in a bearing 49a the latter being affixed to the upper side portion of the separator shoe housing 11. This shaft 49 has a pulley affixed thereto and pulley 50 is provided with a conventional endless drive belt 51 which is trained thereover and drive belt 51 is also entrained over the power take off pulley (not shown) of the combine. A larger pulley 52 is also affixed to the shaft 49 and a belt 53 is entrained over pulley 52 and pulley 26b. Thus it will be seen that the auger conveyer 26 and the bladed fan mechanism 32 may be readily driven from the power take off of the combine through the medium of the belt and pulley drive.

It will, therefore, be seen from the foregoing description that I have provided a novel chaff collecting and conveying attachment which may be readily attached to any conventional combine structure to permit collection of the chaff material, which is ordinarily discharged upon the ground. As pointed out above, it has been found that this chaff material is comprised of substances having a very high food value for farm animal consumption when this chaff material is mixed with hay and silage. It will be noted that the collection of chaff material obviates the need, subsequently forming the discharged straw into bales which is a very time-consuming operation.

It will also be seen that the objectionable plant seed, such as wild oats, barley beards, sow thistles and the like, are readily and efficiently collected through the use of my novel chaff collecting and conveying apparatus, the collection of the seeds preventing the growth of plants from these seeds during the next or subsequent seasons.

It will also be noted from the preceding paragraphs that my novel combining attachment is not only of simple and inexpensive construction but functions in a more efficient manner than any heretofore known comparable devices.

It will further be noted that harvesting combines incorporating my novel chaff-collecting and conveying attachment may be operated in such a manner that there is not only a saving in time but that there is also a great saving in material.

It will, of course, be understood that various changes may be made in the form, details, arrangement and proportions of the various parts without departing from the scope of my invention.

What is claimed is:

1. A chaff collecting and conveying device for use with conventional grain harvesting combines of the type including a separator housing, agitated straw walker means for conveying straw rearwardly through said housing for discharge therefrom, grain return means for collecting grain separated from the straw by said straw walker means, reciprocating chaffer and grain sieves shiftably mounted in said housing, and blower mechanism mounted forwardly of and below the chaffer and grain sieves for discharging an air stream upwardly and rearwardly through the latter for air separation and rearward discharge of the chaff material from the grain, said chaff collecting and conveying device including a deflector member adapted to be mounted transversely of and adjacent the rear of the separator housing for causing the air entrained chaff material to be deflected downwardly, a first conveyor means adapted to be mounted transversely of the separator housing and being positioned below said deflector and cooperating therewith for conveying deflected chaff material in a lateral direction to one side of the separator housing, and a pneumatic conveying mechanism mounted closely adjacent said first conveyor means and cooperating therewith for receiving the chaff material from the latter for pneumatically conveying the chaff material in an upward direction for discharge into a chaff receiving receptacle.

2. A chaff collecting and conveying device for use with conventional grain harvesting combines of the type including a separator housing, agitated straw walker means for conveying straw rearwardly through said housing for discharge therefrom, grain return means for collecting grain separated from the straw by said straw walker means, reciprocating chaffer and grain sieves shiftably mounted in said housing, and blower mechanism mounted forwardly of and below the chaffer and grain sieves for dicharging an air stream upwardly and rearwardly through the latter for air separation and rearward discharge of the chaff material from the grain, said chaff collecting and conveying device including a deflector member adapted to be mounted transversely of and adjacent the rear of the separator housing for causing the air entrained chaff material to be deflected downwardly, a first conveyor means adapted to be mounted transversely of the separator housing and being positioned below said deflector and cooperating therewith for conveying deflected chaff material in a lateral direction to one side of the separator housing, and pneumatic conveyor means cooperating with said first mentioned conveyor mechanism for discharging the chaff material into a chaff receiving receptacle, said pneumatic conveyor means including a second housing having an inlet cooperating with said first mentioned conveyor means for receiving material conveyed by the latter therethrough and having an upwardly extending tangential discharge outlet, a fan mechanism mounted within said second housing for producing a stream of air to cause the chaff material within said second housing to be entrained in the air stream for discharge through said discharge outlet and a discharge conduit connected to said second housing in communicating relation with said discharge outlet and extending upwardly therefrom for discharge of said material into a chaff receiving receptacle.

3. The structure as defined in claim 2, wherein said discharge conduit includes a rearwardly directed section from which the chaff material is discharged and which is pivotally connected to the remainder of said discharge conduit for swinging movement about a horizontal transverse axis, and elongate longitudinally adjustable bracing means having one end thereof pivotally supported by said housing and the other end thereof pivotally connected to said section for varying the position of said section and maintaining same in any desired position.

4. The structure of claim 3, wherein said bracing means includes an elongate rigid member and a turnbuckle operatively connected to each other and to said housing and conduit section.

5. A chaff collecting and conveying device for use with conventional grain harvesting combines of the type including a separator housing, agitated straw walker means for conveying straw rearwardly through said housing for discharge therefrom, grain return means for collecting grain separated from the straw by said straw walker means, reciprocating chaffer and grain sieves shiftably mounted in said housing, and blower mechanism mounted forwardly of and below the chaffer and grain sieve for discharging an air stream upwardly and rearwardly through the latter for air separation and rearward discharge of the chaff material from the grain, said chaff collecting and conveying device including a deflector member adapted to be mounted transversely of and adjacent the rear of the separator housing for causing the air entrained chaff material to be deflected downwardly, an elongate channel structure adapted to be mounted transverserly of the separator housing and being positioned below said deflector member cooperating therewith for receiving the deflected chaff material therein, a conveyor mechanism positioned within said channel structure for conveying the chaff material to one side of said channel structure, and pneumatic conveyor means including a second housing mounted at said one end of the channel structure and having an inlet disposed in communicating relation with the channel structure and cooperating with said conveyor mechanism for receiving material conveyed by the latter therethrough and into said second housing, said second housing having an upwardly extending tangential discharge outlet and having a fan mechanism positioned therewithin for producing a stream of air to cause the chaff material within said second housing to be entrained in the air stream for discharge through said discharge outlet, and a discharge conduit connected to said second housing in communicating relation to said discharge outlet and extending upwardly therefrom for discharging the air entrained chaff material into a chaff receiving receptacle.

6. A chaff collecting and conveying device for use with conventional grain harvesting combines of the type including a separator housing, agitated straw walker means for conveying straw rearwardly through said housing for discharge therefrom, grain return means for collecting grain separated from the straw by said straw walker means, reciprocating chaffer and grain sieves shiftably mounted in said housing, and blower mechanism mounted forwardly of and below the chaffer and grain sieves for discharging an air stream upwardly and rearwardly through the latter for air separation and rearward discharge of the chaff material from the grain, said chaff collecting and conveying device including a deflector member adapted to be hingedly mounted transversely of and adjacent the rear of the separator housing and being positioned to cause the air entrained chaff material to be deflected downwardly, an elongate channel structure adapted to be mounted transversely of the separator housing and being positioned below the deflector member for receiving the chaff material deflected by the latter, a conveyor mechanism positioned within said channel structure serving to convey the chaff material to one end of the latter, pneumatic conveyor means including a second housing mounted at one end of said channel structure and having an inlet communicating with the latter cooperating with said conveyor mechanism for receiving material conveyed by the latter therethrough and into said second housing, said second housing having an upwardly extending tangential discharge outlet and having a fan mechanism rotatably mounted therewithin for producing a stream of air to cause the chaff material within said second housing to be entrained in the air stream for discharge through the discharge outlet, and an elongate discharge conduit connected to said second housing in communicating relation with said discharge outlet and extending upwardly therefrom for discharging the air entrained chaff material into a chaff receiving receptacle.

7. A chaff collecting and conveying device for use with conventional grain harvesting combines of the type including a separator housing, agitated straw walker means for conveying straw rearwardly through said housing for discharge therefrom, grain return means for collecting grain separated from the straw by said straw walker means, reciprocating chaffer and grain sieves shiftably mounted in said housing, and blower mechanism mounted forwardly of and below the chaffer and grain sieves for discharging an air stream upwardly and rearwardly through the latter for air separation and rearward discharge of the chaff material from the grain, said chaff collecting and conveying device including a deflector member adapted to be mounted transversely of and adjacent the rear of the separator housing for causing the air entrained chaff material to be deflected downwardly, an elongate channel structure adapted to be mounted transversely of the separator housing and being positioned below the deflector member for receiving the chaff material deflected by the latter, an elongate auger conveyor rotatably mounted within the elongate channel structure for rotation relative thereto, said auger conveyor having a shaft extending axially from one end thereof, pneumatic conveyor means including a second housing mounted at one end of said channel structure and having an inlet communicating with the channel structure and cooperating with the auger conveyor for receiving material conveyed by the latter therethrough, said second housing having an upwardly extending tangential discharge outlet, said shaft projecting into said second housing, a fan mechanism fixedly mounted on said shaft for rotation therewith and serving to produce a stream of air to cause the chaff within said second housing to be entrained in the air stream for discharge through the discharge outlet, and an elongate discharge conduit connected to said second housing in communicating relation with said discharge outlet and extending upwardly and rearwardly therefrom for discharging the air entrained chaff material into a chaff receiving receptacle.

References Cited in the file of this patent

UNITED STATES PATENTS

| | | |
|---|---|---|
| 2,645,821 | Fowler | July 21, 1953 |
| 2,699,867 | Kitten | Jan. 18, 1955 |
| 2,729,330 | Newirth | Jan. 3, 1956 |
| 2,875,768 | Belkowski | Mar. 3, 1959 |
| 2,968,400 | Clute | Jan. 17, 1961 |

FOREIGN PATENTS

| | | |
|---|---|---|
| 244 of 1926 | Australia | Jan. 25, 1926 |